(12) United States Patent
Cai et al.

(10) Patent No.: US 11,076,668 B2
(45) Date of Patent: Aug. 3, 2021

(54) PORTABLE FOLDING SOLAR POWER GENERATION CLOTH BAG

(71) Applicant: Beijing Apollo Ding Rong Solar Technology Co., Ltd., Beijing (CN)

(72) Inventors: Jijun Cai, Beijing (CN); Dikai Lu, Beijing (CN); Dezheng Hu, Beijing (CN); Yan Qian, Beijing (CN)

(*) Notice: Subject to any disclaimer, the term of this patent is extended or adjusted under 35 U.S.C. 154(b) by 530 days.

(21) Appl. No.: 16/080,239

(22) PCT Filed: Feb. 24, 2017

(86) PCT No.: PCT/CN2017/074694
§ 371 (c)(1),
(2) Date: Aug. 27, 2018

(87) PCT Pub. No.: WO2017/144003
PCT Pub. Date: Aug. 31, 2017

(65) Prior Publication Data
US 2019/0045898 A1    Feb. 14, 2019

(30) Foreign Application Priority Data

Feb. 26, 2016 (CN) .......................... 201620147935.7

(51) Int. Cl.
*A45C 15/00* (2006.01)
*A45C 5/03* (2006.01)
(Continued)

(52) U.S. Cl.
CPC ................ *A45C 15/00* (2013.01); *A45C 5/03* (2013.01); *A45C 7/0054* (2013.01); *A45C 13/00* (2013.01); *H02S 30/20* (2014.12)

(58) Field of Classification Search
CPC ......... A45C 15/00; A45C 5/03; A45C 7/0054; A45C 13/00; H02S 30/20
See application file for complete search history.

(56) References Cited

U.S. PATENT DOCUMENTS

| 5,522,943 A | * | 6/1996 | Spencer | .............. | H02S 10/40 136/245 |
| 8,410,748 B2 | * | 4/2013 | Wilson | .............. | H02J 7/0042 320/101 |

(Continued)

FOREIGN PATENT DOCUMENTS

| CN | 201584912 | 9/2010 |
| CN | 202588676 | 12/2012 |

(Continued)

OTHER PUBLICATIONS

International Search Report for PCT/CN2017/074694 dated May 31, 2017 in 5 pages.

(Continued)

*Primary Examiner* — Tri M Mai (57) ABSTRACT

Portable folding solar power generation cloth bags are disclosed. One implementation comprises left and right lining plates each having holes and fixed above a lower cloth cover, left and right solar assemblies fixed above their respective lining plates, an upper cloth cover overlaying both solar assemblies and sewn to the lower cloth cover with a gap between the left and right lining plates, and junction boxes associated with respective left and right solar assemblies and embedded into the holes of the left and right lining plates, wherein a connecting line between the left and right solar assemblies may penetrate through the lower cloth cover to extend therebelow. Further, light receiving surfaces of the left and right solar assemblies are configured for external exposure from the upper cloth cover, and a foldable joint may be formed at a gap position between the upper and lower cloth covers.

20 Claims, 5 Drawing Sheets

(51) Int. Cl.
  *A45C 7/00*   (2006.01)
  *H02S 30/20*  (2014.01)
  *A45C 13/00*  (2006.01)

(56) References Cited

U.S. PATENT DOCUMENTS

| | | | | |
|---|---|---|---|---|
| 8,432,124 | B2* | 4/2013 | Foster | A45C 15/00 |
| | | | | 320/101 |
| 8,760,108 | B2* | 6/2014 | Scarmozzino | H02J 50/10 |
| | | | | 320/101 |
| 9,653,632 | B1* | 5/2017 | Beitman, Sr. | H01L 31/0547 |
| 9,865,903 | B1* | 1/2018 | Petrella | H01M 10/465 |
| 10,051,945 | B1* | 8/2018 | Pomare | A45F 3/02 |
| 2006/0012331 | A1* | 1/2006 | Gillette | A45C 15/00 |
| | | | | 320/107 |
| 2014/0265996 | A1* | 9/2014 | Djeu | H02S 10/40 |
| | | | | 320/101 |
| 2015/0102762 | A1* | 4/2015 | Goei | H02J 7/35 |
| | | | | 320/101 |

FOREIGN PATENT DOCUMENTS

| | | |
|---|---|---|
| CN | 203884929 | 10/2014 |
| CN | 203895997 | 10/2014 |
| CN | 204089712 | 1/2015 |
| CN | 204467278 | 7/2015 |

OTHER PUBLICATIONS

Written Opinion for PCT/CN2017/074694 dated May 31, 2017 in 5 pages.

* cited by examiner

PORTABLE FOLDING SOLAR POWER GENERATION CLOTH BAG

CROSS-REFERENCE TO RELATED APPLICATIONS

This application is a U.S. 371 National Phase of International Application No. PCT/CN2017/074694, filed on Feb. 24, 2017, published as WO2017/144003A1, which claims benefit/priority of Chinese patent application No. CN201620147935.7, filed Feb. 26, 2016, entitled "Portable Folding Solar Power Generation Cloth Bag", the entire contents of all of which are incorporated herein by reference in entirety.

TECHNICAL FIELD

The present disclosure relates to the field of solar power generation and handbags, and particularly to a portable folding solar power generation cloth bag.

BACKGROUND ART

The application of energy is getting diversified, and the trend of decentralization and environmental diversification of goods for civilian use increasingly becomes clearer.

However, energy storage devices have limited capability of providing the energy, and the capability of supplementing the energy is demanded. The solar power, as a type of energy that is less restricted by environment or facility conditions, can achieve real-time application and flexible supplementation of energy in various diversified environments, improve cruising capabilities of products for civilian use and terminal energy-storage products, and provide more room for energy use of various types of devices, products, and instrument.

Existing foldable non-fixed solar power generation products either have a very small power or are quite bulky, with an insufficient output capability or a large occupation for transportation, or a too much overall weight, and are inconvenience in carrying.

In a Chinese patent for utility model with the number of announcement of grant of patent right CN204763958U, entitled "Handy Solar Energy Folding Bag of Intelligence", a solar power generation device is carried in a foldable manner using a cloth bag, a surface of a solar cell panel is protected by a scratch-resistant film, and silica gel is filled between individual pieces of the cloth bag. However, in this technical solution, the protection to the solar cell panel, a junction box, and a connecting line in the solar cell assembly is relatively weak, particularly for the junction box, since it is disposed together with the solar cell panel in a step-shape recess, it has no separate protection structure, thus loosening and other failure risks easily occur in a carrying process.

Summary of Certain Innovative Aspects

According to certain implementations herein, portable folding solar power generation cloth bags are disclosed. In one aspect, a portable folding solar power generation cloth bag may include a lower cloth cover; a left lining plate and a right lining plate fixed above the lower cloth cover, the left lining plate and the right lining plate being separately provided with a through hole; a left solar assembly and a right solar assembly, which are fixed above the left lining plate and the right lining plate respectively, wherein a junction box of the left solar assembly is embedded into the through hole of the left lining plate, and a junction box of the right solar assembly is embedded into the through hole of the right lining plate, and a connecting line between the left solar assembly and the right solar assembly penetrating through the lower cloth cover and reaching a position below the lower cloth cover; and an upper cloth cover covering the upper sides of the left solar assembly and the right solar assembly, the upper cloth cover being sewn with the lower cloth cover. Further, light receiving surfaces of the left solar assembly and the right solar assembly may being exposed from the upper cloth cover, a gap may be provided between the left lining plate and the right lining plate, and a foldable joint may bei formed at a gap position between the upper cloth cover and the lower cloth cover.

Reference signs: 1. lower cloth cover, 2. sponge mat, 3. left lining plate, 4. right lining plate, 5. left solar assembly, 6. right solar assembly, 7. upper cloth cover, 8. eyelet button, 9. junction box shield, 10. pocket, 11. overedging, 12. buckle, 13. overedging, 14. overedging, 15. through hole, 16. through hole, 17. through hole, 18. junction box, 19. light receiving surface, 20. handle, 21. gap, 22. connecting line.

DETAILED DESCRIPTION OF EMBODIMENTS

An objective of one or more aspects of the present disclosure is to enhance the protection for a solar cell assembly in a portable solar power cloth bag.

In order to achieve such objective(s), embodiments of the present disclosure may include or involve technical solutions such as the following.

According to certain implementations herein, portable folding solar power generation cloth bags are disclosed. In one aspect, a portable folding solar power generation cloth bag may include a lower cloth cover; a left lining plate and a right lining plate fixed above the lower cloth cover, the left lining plate and the right lining plate being separately provided with a through hole; a left solar assembly and a right solar assembly, which are fixed above the left lining plate and the right lining plate, respectively, wherein a junction box of the left solar assembly is embedded into the through hole of the left lining plate, and a junction box of the right solar assembly is embedded into the through hole of the right lining plate, and a connecting line between the left solar assembly and the right solar assembly penetrating through the lower cloth cover and reaching a position below the lower cloth cover; and an upper cloth cover covering the upper sides of the left solar assembly and the right solar assembly, the upper cloth cover being sewn with the lower cloth cover. Further, light receiving surfaces of the left solar assembly and the right solar assembly may be exposed from the upper cloth cover, a gap may be provided between the left lining plate and the right lining plate, and a foldable joint may be formed at a gap position between the upper cloth cover and the lower cloth cover.

In some implementations, a sponge mat may be fixed between the left lining plate and the lower cloth cover, and between the right lining plate and the lower cloth cover.

In certain implementations, the above portable folding solar power generation cloth bag may further include a junction box shield, the junction box shield being fixed below the lower cloth cover (e.g., via buckles), and further where portions of the junction box and the connecting line exposed below the lower cloth cover are covered by the junction box shield.

In to some aspects, a pocket may be sewn below the lower cloth cover. Further, buckles may be sewn on both left and right sides of the upper cloth cover. According to certain aspects, the above portable folding solar power generation cloth bag may further include a handle, wherein the handle may be formed by cutting out the upper cloth cover and the lower cloth cover and fixing an over-edging at an edge, or the handle may be a separate part connected to the upper cloth cover and/or the lower cloth cover.

In other aspects, edges of the upper cloth cover and the lower cloth cover may be fixed with an over-edging.

According to some implementations, such over-edging may be fixed at the through holes.

Further, eyelet buttons may be fixed at four corners of the upper cloth cover and the lower cloth cover.

In still other implementations, the left lining plate and the right lining plate may be plastic plates or plastic hollowed plates.

According to various implementations herein, lining plates consistent with embodiments of the present disclosure not only serve a function of enhancing the support to solar cell panels of the solar assemblies, but also support and protect the junction boxes separately via, or by means of, the through holes thereof. As such, in a carrying process, even during an incident of shaking, it is only the solar cell panels of the solar assemblies and the junction boxes that move with the lining plates, whereas risk of the solar cell panels being separated from the junction boxes does not exist or occur. Moreover, in various embodiments of the present disclosure, the upper cloth cover and the lower cloth cover fix the lining plates, the solar assemblies and other parts in a sewing manner, e.g., without a frame, thus the thickness is small, the weight is light, and both rigid assemblies and flexible assemblies can be encapsulated into a lightweight combination form factor. Accordingly, such implementations may be easier to carry, use, and store, and have advantages such as foldability, easy encapsulation, good user accessibility and the like of the cloth bags. Among other things, certain advantages of the flexible solar assembly can be brought into full play, the space for carrying out and transporting the goods is greatly reduced, and the lesser weight renders improved transportation efficiency and user experience.

In some aspects, the sponge mats can provide shock-resistant protection to the solar assemblies.

In additional aspects, fixing the junction box shield by means of buckles can not only serve a function of protecting the junction boxes and the connecting line, but also can make the junction box shield open to facilitate use.

According to other aspects, over-edging various positions can serve a function of preventing tearing of the edges.

Further, uses of the buckles, handle, and eyelet buttons can facilitate carrying/transportation, e.g., after folding.

Consistent with some implementations, providing a pocket also allows for the accommodation of cables, accessories, instructions, and other such beneficial items.

Figure 1:
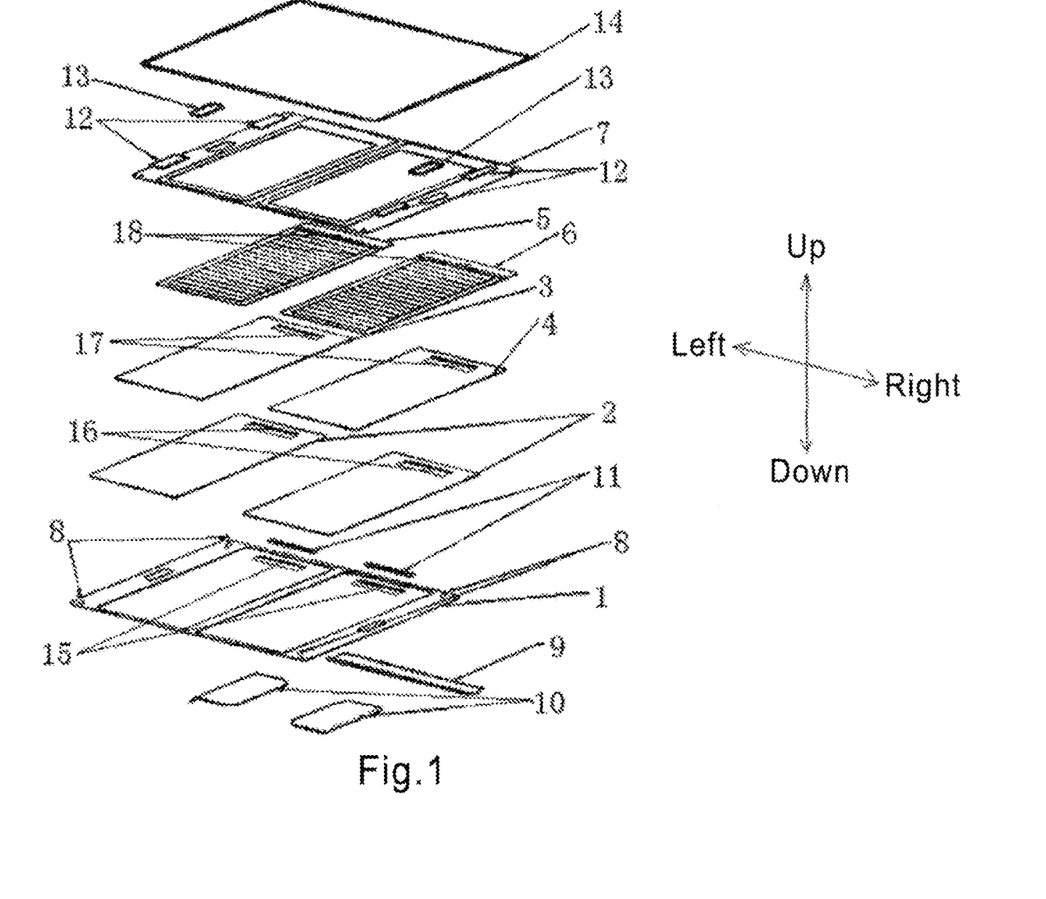
FIG. 1 is an exploded structural diagram of a portable folding solar power generation cloth bag in First Embodiment of the present disclosure.

Referring to FIG. 1, a portable folding solar power generation cloth bag in the present embodiment includes a lower cloth cover 1, a sponge mat 2, a left lining plate 3, a right lining plate 4, a left solar assembly 5, a right solar assembly 6, an upper cloth cover 7, a junction box shield 9 and so on. In the above, the lower cloth cover 1 and the upper cloth cover 7 can be made of a flexible and foldable material such as natural or artificial fiber textiles, for embodiment, nylon 600D, high-molecular polymers, leather and so on.

Eyelet buttons 8 are fixed at four corners of the lower cloth cover 1. Through holes 15 are further provided on the lower cloth cover 1. A pocket 10 is sewn below the lower cloth cover 1, for accommodating cables, accessories, instructions and so on.

The left lining plate 3 and the right lining plate 4 are fixed above the lower cloth cover 1 in a manner of being spaced from each other. Corresponding to the through holes 15 on the lower cloth cover 1, through holes 17 are provided on both of the left lining plate 3 and the right lining plate 4.

A sponge mat 2 is fixed between the left lining plate 3 and the lower cloth cover 1, and between the right lining plate 4 and the lower cloth cover 1, respectively, and the sponge mats 2 are also opened with through holes 16 corresponding to the through holes 15. The sponge mats 2 are used to improve shock-resistant performances.

The through holes 17 on the left lining plate 3 and the right lining plate 4, the through holes 16 on the sponge mats 2, and the through holes 15 on the lower cloth cover 1 are aligned, and then fixed with overedgings 11 so as to protect the edges of the through holes.

The left solar assembly 5 is fixed above the left lining plate 3, and the right solar assembly 6 is fixed above the right lining plate 4. In assembling, a junction box 18 of the left solar assembly 5 is embedded into the through hole 17 of the left lining plate 3, passing through the through hole 16 of the sponge mat 2 and the through hole 15 of the lower cloth cover 1 to be exposed below the lower cloth cover 1. Likewise, a junction box 18 of the right solar assembly 6 is embedded into the through hole 17 of the right lining plate 4, passing through the through hole 16 of the sponge mat 2 and the through hole 15 of the lower cloth cover 1 to be exposed below the lower cloth cover 1. The left lining plate 3 and the right lining plate 4 are plastic plates or plastic hollowed plates, with a small density and being capable of providing support to the left solar assembly 5 and the right solar assembly 6. The left lining plate 3 and the right lining plate 4 in the present embodiment not only serve a function of enhancing the support to solar cell panels of the left solar assembly 5 and the right solar assembly 6, but also support and protect the junction boxes 18 separately by means of the through holes 17 thereof, therefore, in a carrying process, even if in case of shaking, it is still the solar cell panels of the solar assemblies and the junction boxes 18 that move together with the lining plates, the risk of the solar cell panels being separated from the junction boxes 18 will not occur.

The upper cloth cover 7 covers the above of the left solar assembly 5 and the right solar assembly 6. The upper cloth cover 7 and the lower cloth cover 1 are sewn together through a stitching technology, and after being sewn, the two are fixed with an overedging 14 at edges to protect the edges of the upper cloth cover 7 and the lower cloth cover 1. Buckles 12 are sewn on both left and right sides of the upper cloth cover 7. The eyelet buttons 8 at four corners of the lower cloth cover 1 simultaneously pass through the upper cloth cover 7 and then fixed. The portable folding solar power generation cloth bag can be hung up after a thread passes through the eyelet buttons 8. In First Embodiment, a handle 20 (see FIG. 2) is formed by cutting out the upper cloth cover 7 and the lower cloth cover 1, and an overedging 13 is fixed at an edge of the handle 20.

Figure 2:
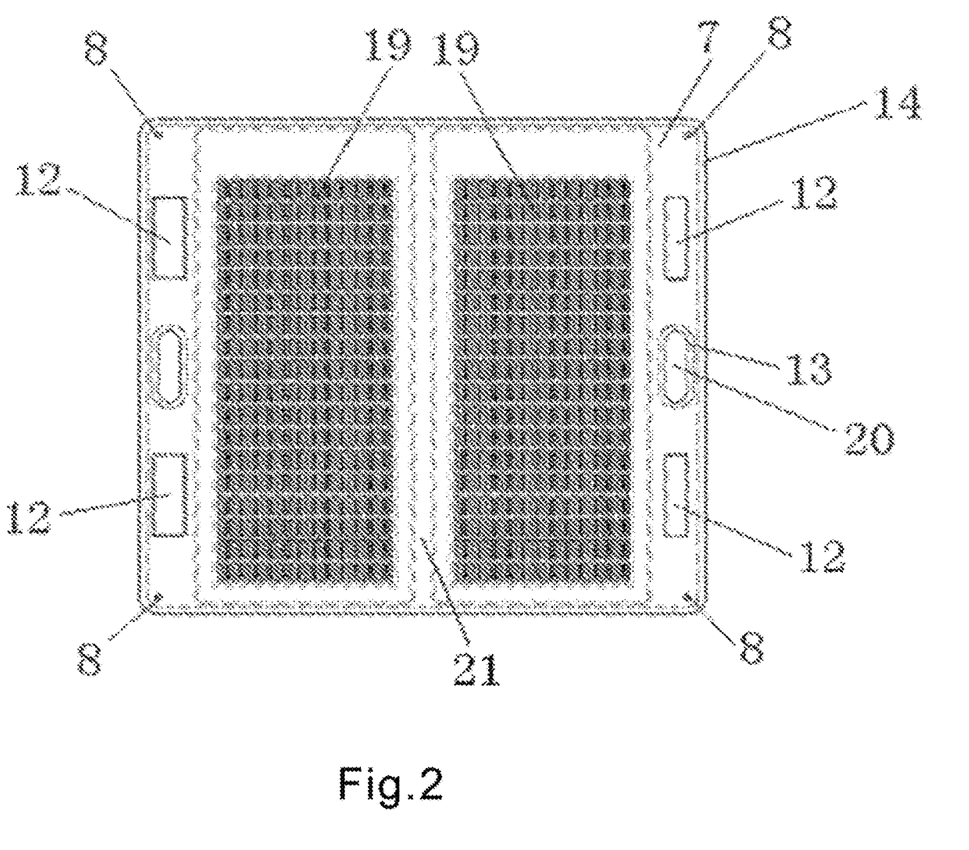
FIG. 2 is a top view of the portable folding solar power generation cloth bag in First Embodiment of the present disclosure.

Referring to FIG. 2, after the upper cloth cover 7 and the lower cloth cover 1 are sewn together, flexible and non-flexible parts such as the left solar assembly 5, the right solar assembly 6, the left lining plate 3, the right lining plate 4, the sponge mats 2 and so on are encapsulated into one bag, and the light receiving surfaces 19 of the left solar assembly 5 and the right solar assembly 6 are exposed from the upper cloth cover 7 so as to receive irradiation of sunlight in an open state. A gap 21 exists between the left lining plate 3 and the right lining plate 4, therefore, the upper cloth cover 7 and the lower cloth cover 1 form a foldable joint at a position of the gap 21.

Figure 3:
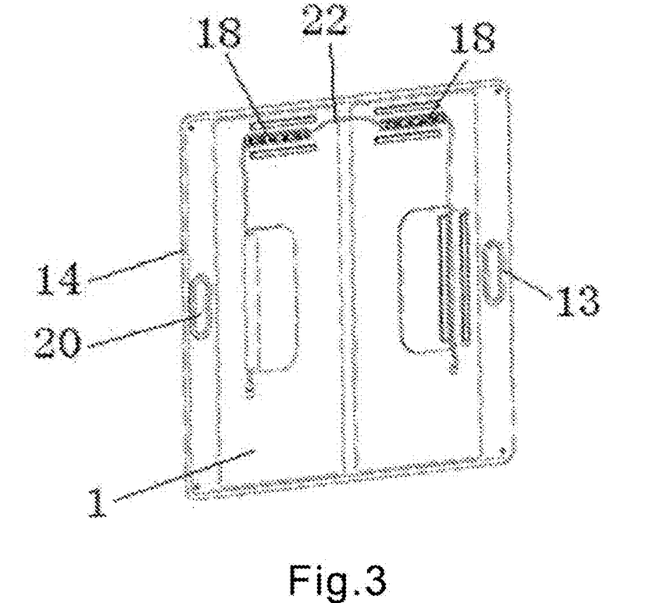
FIG. 3 is a perspective diagram of the portable folding solar power generation cloth bag in First Embodiment of the present disclosure.

Referring to FIG. 3, a connecting line 22 between the left solar assembly 5 and the right solar assembly 6 penetrates through the lower cloth cover 1 and reaches a position below the lower cloth cover 1. The connecting line 22 is used for series connection between the left solar assembly 5 and the right solar assembly 6. In cases where the junction box 18 is exposed below the lower cloth cover 1, an internal wiring of the junction box 18 also can be regarded as a part of the connecting line 22.

Figure 4:
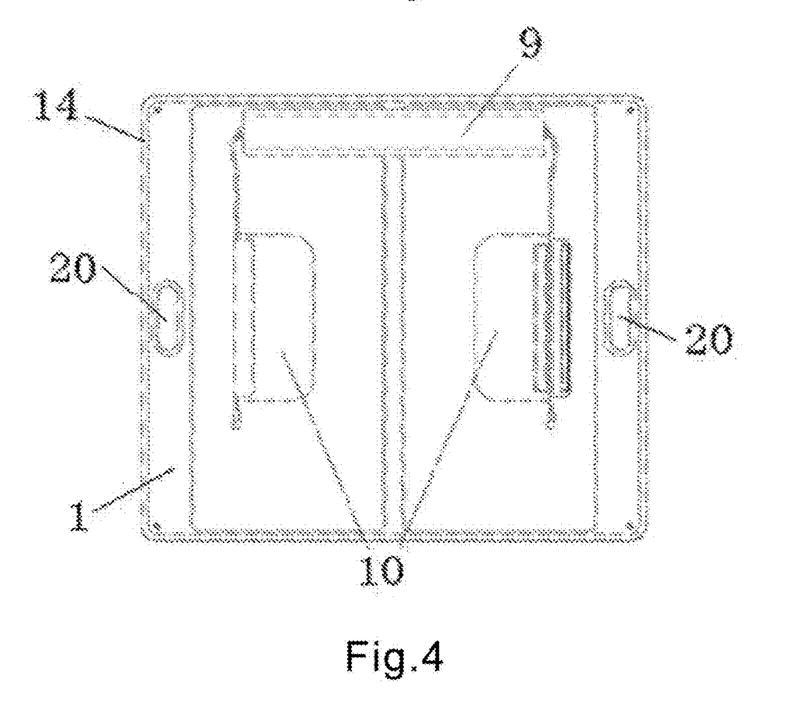
FIG. 4 is a bottom view of the portable folding solar power generation cloth bag in First Embodiment of the present disclosure.

Referring to FIG. 1, FIG. 3, and FIG. 4, the junction box shield 9 is fixed below the lower cloth cover 1 through buckles, portions of the junction box 18 and the connecting line 22 exposed below the lower cloth cover 1 are covered by the junction box shield 9, the junction box shield 9 is used to protect the junction box 18 and the connecting line 22 in a carrying process, and the junction box shield 9 can be conveniently flipped open in cases of use or maintenance.

Figure 5:
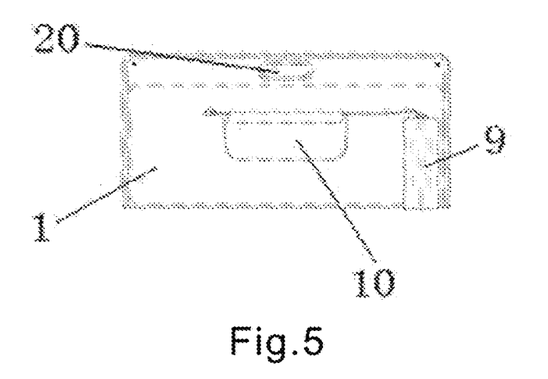
FIG. 5 is a schematic diagram of the portable folding solar power generation cloth bag in a folded state in First Embodiment of the present disclosure.

Referring to FIG. 2 and FIG. 5, after the folding along the foldable joint, the buckles 12 are connected together such that the portable folding solar power generation cloth bag is kept in a folded state, at which time a carrier can carry the portable folding solar power generation cloth bag by gripping the handle 20.

In the present embodiment, the upper cloth cover 7 and the lower cloth cover 1 fix the lining plates, the solar assemblies and other parts in a sewing manner, without a frame, thus the thickness is small, the weight is light, both rigid assemblies and flexible assemblies can be encapsulated into a lightweight combination form, thus being easy to carry, use, and store, and having the advantages of foldability, easy encapsulation, good user accessibility and so on of the cloth bags, particularly, the advantages of the flexible solar assembly can be brought into full play, then the space for carrying out and transportation is greatly reduced, and the light weight renders improved transportation efficiency and use experience.

Figure 6:
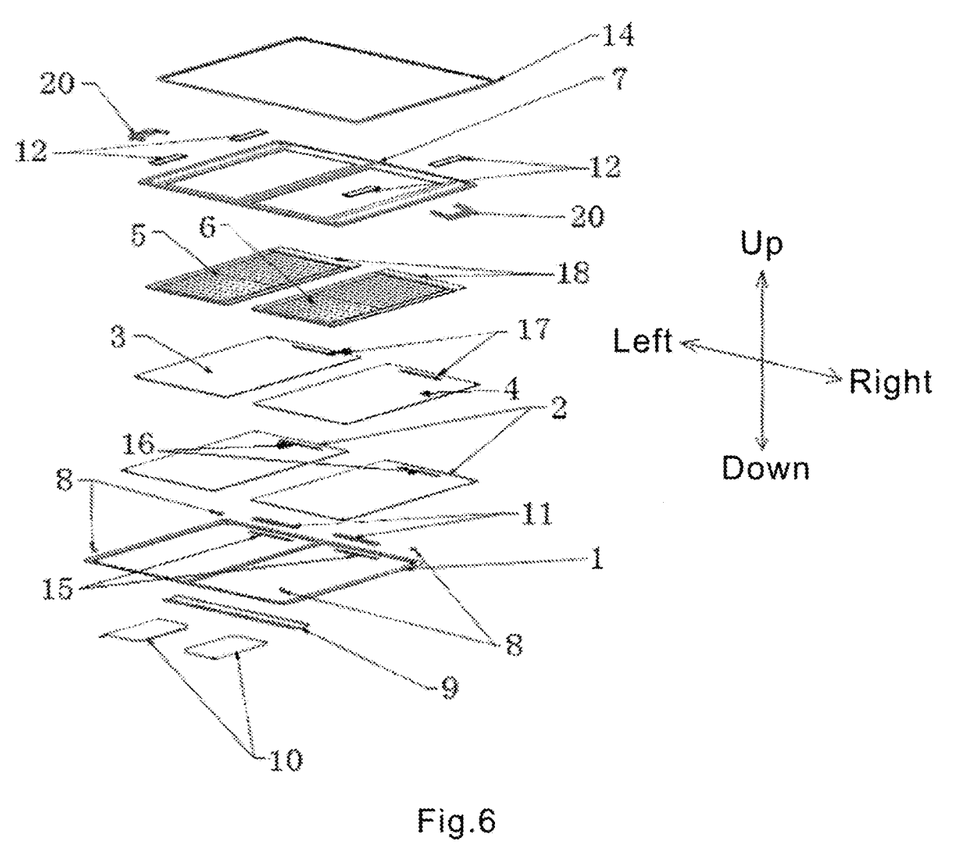
FIG. 6 is an exploded structural diagram of the portable folding solar power generation cloth bag in Second Embodiment of the present disclosure.
Figure 7:
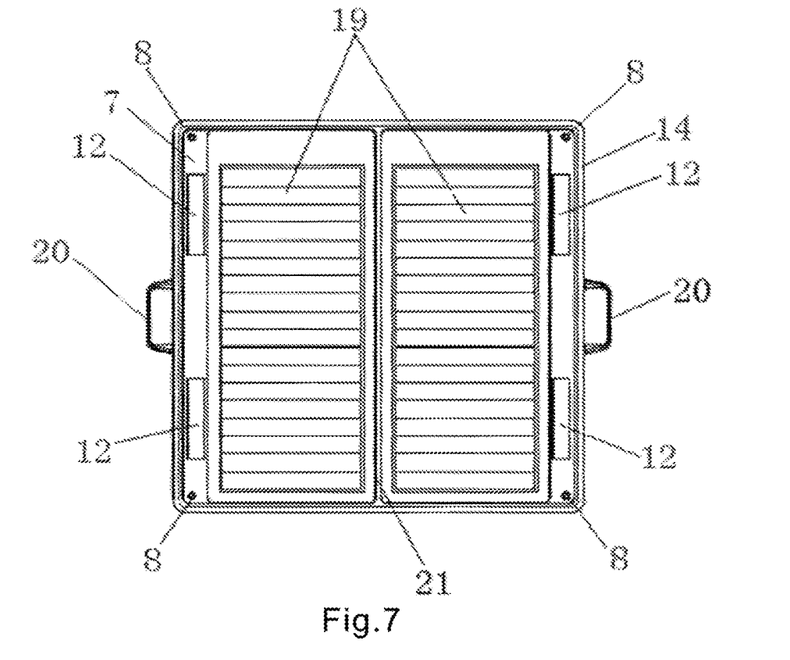
FIG. 7 is a top view of the portable folding solar power generation cloth bag in Second Embodiment of the present disclosure.
Figure 8:
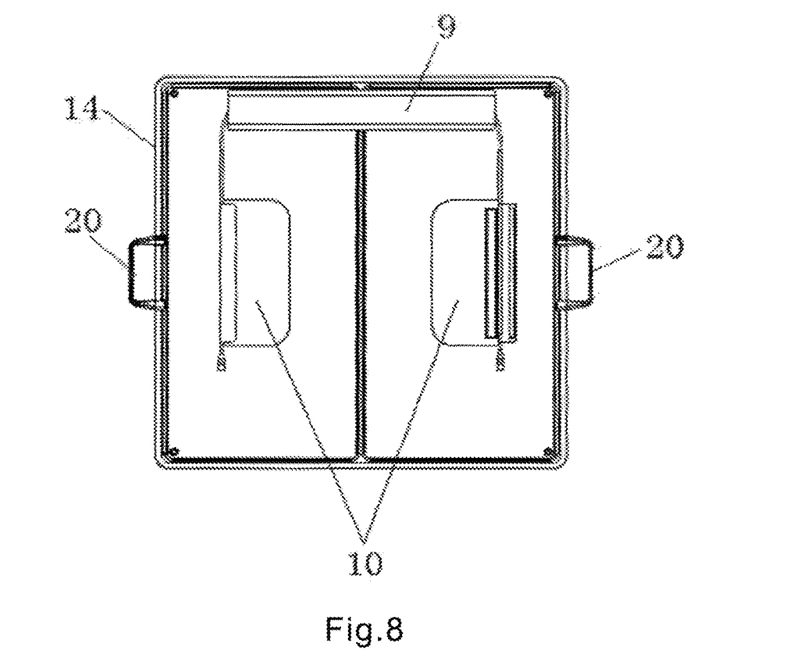
FIG. 8 is a bottom view of the portable folding solar power generation cloth bag in Second Embodiment of the present disclosure.

Referring to FIG. 6 to FIG. 8, different from First Embodiment, in Second Embodiment, the handle 20 is a separate part, and connected to the upper cloth cover 7 and/or the lower cloth cover 1 in a connecting manner such as sewing, riveting and so on, while the upper cloth cover 7 and the lower cloth cover 1 are no longer cut out, which is favorable to reducing the cost and technology difficulty. Likewise, in Second Embodiment, the handle 20 also can be cladded with an overedging.

Although the present disclosure is described in combination with the above embodiments, the present disclosure is not limited to the above embodiments, but is merely defined by the claims. A person ordinarily skilled in the art can readily make modifications and alterations thereto, without departing from the essential concept and scope of the present disclosure.

What is claimed is:

1. A portable folding solar power generation cloth bag, comprising:
    a lower cloth cover;
    a left lining plate and a right lining plate fixed above the lower cloth cover, the left lining plate and the right lining plate being each provided with a through hole;
    a left solar assembly and a right solar assembly, which are fixed above the left lining plate and the right lining plate, respectively, wherein a junction box of the left solar assembly is embedded into the through hole of the left lining plate, a junction box of the right solar assembly is embedded into the through hole of the right lining plate, a connecting line between the left solar assembly and the right solar assembly is through the lower cloth cover and reaches a position below the lower cloth cover;
    an upper cloth cover covering the upper sides of the left solar assembly and the right solar assembly, the upper cloth cover being sewn together with the lower cloth cover, and light receiving surfaces of the left solar assembly and the right solar assembly being exposed to outside from the upper cloth cover,
    wherein a gap exists between the left lining plate and the right lining plate, and a foldable joint is formed at a gap position between the upper cloth cover and the lower cloth cover.

2. The portable folding solar power generation cloth bag of claim 1, wherein a sponge mat is fixed between the left lining plate and the lower cloth cover, and between the right lining plate and the lower cloth cover.

3. The portable folding solar power generation cloth bag of claim 1, wherein a pocket is sewn below the lower cloth cover.

4. The portable folding solar power generation cloth bag of claim 1, wherein buckles are sewn on both left and right sides of the upper cloth cover.

5. The portable folding solar power generation cloth bag of claim 1, further comprising a handle, the handle being formed by cutting out the upper cloth cover and the lower cloth cover and fixing an over-edging at an edge, or the handle being a separate part connected to the upper cloth cover and/or the lower cloth cover.

6. The portable folding solar power generation cloth bag of claim 1, wherein edges of the upper cloth cover and the lower cloth cover are formed with a fixed over-edging.

7. The portable folding solar power generation cloth bag of claim 1, wherein an overedging is fixed at the through holes.

8. The portable folding solar power generation cloth bag of claim 1, wherein eyelet buttons are fixed at four corners of the upper cloth cover and the lower cloth cover.

9. The portable folding solar power generation cloth bag of claim 1, wherein the left lining plate and the right lining plate are plastic plates or plastic hollowed plates.

10. The portable folding solar power generation cloth bag of claim 1, further comprising a junction box shield, the junction box shield being fixed below the lower cloth cover through buckles, portions of the junction box and the connecting line exposed to a downside direction from the lower cloth cover being covered by the junction box shield.

11. The portable folding solar power generation cloth bag of claim 10, wherein a sponge mat is fixed between the left lining plate and the lower cloth cover, and between the right lining plate and the lower cloth cover.

12. The portable folding solar power generation cloth bag of claim 11, wherein a pocket is sewn below the lower cloth cover.

13. The portable folding solar power generation cloth bag of claim 12, wherein buckles are sewn on both left and right sides of the upper cloth cover.

14. The portable folding solar power generation cloth bag of claim 13, further comprising a handle, the handle being formed by cutting out the upper cloth cover and the lower cloth cover and fixing an over-edging at an edge, or the handle being a separate part connected to the upper cloth cover and/or the lower cloth cover.

15. The portable folding solar power generation cloth bag of claim 14, wherein edges of the upper cloth cover and the lower cloth cover are formed with a fixed over-edging.

16. The portable folding solar power generation cloth bag of claim 15, wherein eyelet buttons are fixed at four corners of the upper cloth cover and the lower cloth cover.

17. The portable folding solar power generation cloth bag of claim 15, wherein an over-edging is fixed at the through holes.

18. The portable folding solar power generation cloth bag of claim 17, wherein eyelet buttons are fixed at four corners of the upper cloth cover and the lower cloth cover.

19. The portable folding solar power generation cloth bag of claim 18, wherein the left lining plate and the right lining plate are plastic plates or plastic hollowed plates.

20. The portable folding solar power generation cloth bag of claim 19, wherein a sponge mat is fixed between the left lining plate and the lower cloth cover, and between the right lining plate and the lower cloth cover.

* * * * *